(12) United States Patent  (10) Patent No.: US 8,982,855 B2
Aghvami et al.  (45) Date of Patent: Mar. 17, 2015

(54) SYSTEMS AND METHODS FOR IMPROVED MOBILITY AND QUALITY OF SERVICE IN A WIRELESS NETWORK

(75) Inventors: Abdol Hamid Aghvami, London (GB); Paul Anthony Pangalos, London (GB); Nima Nafisi, Poitiers (FR)

(73) Assignee: Fortress Credit Co LLC, San Francisco, CA (US)

( * ) Notice: Subject to any disclaimer, the term of this patent is extended or adjusted under 35 U.S.C. 154(b) by 1494 days.

(21) Appl. No.: 12/196,419

(22) Filed: Aug. 22, 2008

(65) Prior Publication Data

US 2009/0052423 A1  Feb. 26, 2009

(30) Foreign Application Priority Data

Aug. 24, 2007  (GB) .................................. 0716529.3

(51) Int. Cl.
| | |
|---|---|
| *H04W 4/00* | (2009.01) |
| *H04W 40/12* | (2009.01) |
| *H04L 12/725* | (2013.01) |
| *H04W 28/26* | (2009.01) |
| *H04W 36/00* | (2009.01) |
| *H04W 80/04* | (2009.01) |

(52) U.S. Cl.
CPC ............. *H04W 40/12* (2013.01); *H04L 45/302* (2013.01); *H04W 28/26* (2013.01); *H04W 36/0011* (2013.01); *H04W 36/0033* (2013.01); *H04W 80/04* (2013.01)
USPC ........................................................ 370/338

(58) Field of Classification Search
None
See application file for complete search history.

(56) References Cited

U.S. PATENT DOCUMENTS

| 7,693,093 B2* | 4/2010 | Riedel et al. .................. 370/260 |
|---|---|---|
| 2003/0026404 A1 | 2/2003 | Joyce et al. |
| 2003/0046022 A1 | 3/2003 | Silverman |

(Continued)

FOREIGN PATENT DOCUMENTS

WO  99/48310 A1  9/1999

OTHER PUBLICATIONS

Robles, T., "The EU IST Project BRAIN/MIND," Nov. 6, 2002, pp. 1-7.

(Continued)

*Primary Examiner* — Rhonda Murphy
(74) *Attorney, Agent, or Firm* — Sean D. Burdick

(57) ABSTRACT

For a mobile node visiting a packet-switched wireless access network, said access network using a tunnelling-type micro-mobility protocol and a Quality of Service (QoS) routing protocol to route packet data to and from said mobile node, and comprising an access router to which said mobile node may attach, a mobility agent and a gateway, a method of configuring said access network to route packet data toward said mobile node which method comprises the steps of: (a) receiving in said access network a handover indication of said mobile node or a login request therefrom; (b) in response to said handover indication or login request computing a QoS route for said mobile node, which QoS route is useable to route packets between said mobility agent and said mobile node; (c) performing step (b) at a location in said access network remote from said mobility agent; and (d) transmitting said QoS route and said handover indication or login request from said remote location toward said mobility agent; whereby upon receipt of data transmitted in step (d) said mobility agent may handle both mobility configuration and QoS route configuration for said mobile node as part of said network layer handover.

21 Claims, 6 Drawing Sheets

(56) References Cited

U.S. PATENT DOCUMENTS

| | | |
|---|---|---|
| 2003/0059049 A1 | 3/2003 | Mihm et al. |
| 2003/0073406 A1 | 4/2003 | Benjamin et al. |
| 2004/0030912 A1 | 2/2004 | Merkle et al. |
| 2004/0038716 A1 | 2/2004 | Gass |
| 2004/0143746 A1 | 7/2004 | Ligeti et al. |
| 2004/0187018 A1 | 9/2004 | Owen et al. |
| 2005/0138155 A1 | 6/2005 | Lewis |
| 2005/0195780 A1 | 9/2005 | Haverinen et al. |
| 2006/0053246 A1 | 3/2006 | Lee |
| 2006/0077100 A1 | 4/2006 | Dahms et al. |
| 2006/0095454 A1 | 5/2006 | Shankar et al. |
| 2006/0161914 A1 | 7/2006 | Morrison et al. |
| 2007/0191012 A1 | 8/2007 | Park et al. |
| 2010/0197293 A1 | 8/2010 | Shem-Tov |

OTHER PUBLICATIONS

Apostolopoulos, G., et al., "QoS Routing Mechanisms and OSPF Extensions," http://tools.ietf.org/rfc/rfc2676.txt, Aug. 1999, pp. 1-44.

Pack, S., et al., "A Study on Performance of Hierarchial Mobile IPv6 in IP-Based Cellular Networks," IEICE Trans. Commun., Mar. 3, 2004, pp. 462-469, vol. E87-B, No. 3.

Zhang, Q., et al., "Integration of Wireless LAN and 3G Wireless: Efficient Mobility Management for Vertical Handoff between WWAN and WLAN," IEEE Communications Magazine, Nov. 2003, pp. 102-108.

Varma, V., et al., "Mobility Management in Integrated UMTS/WLAN Networks*," IEEE, 2003, pp. 1048-1053.

Friderikos, V., et al., "Internet Protocols, Technology and Applications (VoIP)—Analysis of cross issues between QoS routing and μ-mobility protocols," IEE Proc.-Commun., Jun. 2004, pp. 258-262, vol. 151, No. 3.

Ramjee, R., et al., "Hawaii: A Domain-based Approach for Supporting Mobility in Wide-area Wireless Networks," IEEE/ACM Transactions on Networking, Jun. 2002, pp. 396-410, vol. 10, No. 3.

Durham, D., et al., "The COPS (Common Open Policy Service) Protocol," http://tools.ietf.org/rfc/rfc2748.txt, Jan. 2000, pp. 1-34.

Loughney, J., et al., "Context Transfer Protocol (CXTP)," http://tools.ietf.org/rfc/rfc4067.txt, Jul. 2005, pp. 1-29.

Cisco, "Cisco IP RAN Optimization Solution," Dec. 2006, pp. 1-4.

Teitelbaum, B., et al., "QBone Bandwith Broker Architecture," http://qbone.internet2.edu/bb/bboutline2.html, Jun. 26, 2000, pp. 1-37.

Neilson, R., et al., "A Discussion of Bandwith Broker Requirements for Internet2 Qbone Deployment," Internet2 Qbone BB Advisory Council, Aug. 1999, pp. 1-30.

Blake, S., et al., "An Architecture for Differentiated Services," http://tools.ietf.org/rfc/rfc2475.txt, Dec. 1998, pp. 1-32.

Perkins, C., "IP Mobility Support for IPv4," http://tools.ietf.org/rfc/rfc3344.txt, Aug. 2002, pp. 1-87.

Johnson, D., et al., "Mobility Support in IPv6," http://tools.ietf.org/rfc/rfc3775.txt, Jun. 2004, pp. 1-145.

Arkko, J., et al., "Using IPsec to Protect Mobile IPv6 Signaling Between Mobile Nodes and Home Agents," http://tools/ietf.org/rfc/rfc3776.txt, Jun. 2004, pp. 1-36.

Koodli, R., "Fast Handovers for Mobile IPv6," http://ietf.org/rfc/rfc4068.txt, Jul. 2005, pp. 1-38.

Soliman, H., et al., "Hierarachical Mobile IPv6 Mobility Management (HMIPv6)," http://ietf.org/rfc/rfc4140.txt, Aug. 2005, pp. 1-26.

H. Williams, et al., "Web Database Applications with PHP & MySQL", Chapter 1, "Database Applications and the Web", ISBN 0-596-00041-3, O'Reilly & Associates, Inc., Mar. 2002, avail. at: http://docstore.mik.ua/orelly/webprog/webdb/ch01_01.htm. XP002603488.

Lankhorst et al., "Enabling Technology for Personalizing Mobile Services," Proceedings of the 35th Annual Hawaii International Conference on System Sciences, 2002.

Grami, et al., "Future Trends in Mobile Commerce: Service Offerings, Technological Advances and Security Challenges", Proceedings of the 2nd Annual Conference on Privacy, Security and Trust, Oct. 13, 2004.

* cited by examiner

SYSTEMS AND METHODS FOR IMPROVED MOBILITY AND QUALITY OF SERVICE IN A WIRELESS NETWORK

CROSS REFERENCE TO RELATED APPLICATION(S)

This Application claims foreign priority to United Kingdom Patent Application Serial Number: 07 165 29.3 filed Aug. 24, 2007, the entire disclosure of which is herein incorporated by reference.

BACKGROUND

1. Field of the Invention

The present invention relates to a method of configuring a packet-switched wireless access network for simultaneous use of a micro-mobility tunnelling-type protocol and a Quality of Service (QoS) routing protocol, to a packet-switched wireless access network for performing the method, to a router for use in the method, to an access router for use in the method, to a mobile node for use in the method, and to a method of manufacturing such a mobile node 2. Description of the Related Art Many different requirements are expected of the network layer in all-IP access networks (e.g. 4G cellular networks). Two in particular are mobility and QoS. The former enables users to communicate seamlessly with remote network nodes via the Internet wherever they are, whereas the latter enables users to receive different levels of service for certain types of traffic. However, research has shown that problems may arise when attempting to configure an access network to operate a mobility protocol at the same time as a QoS routing protocol.

Best effort routing protocols such as Open Shortest Path First (OSPF) have been extended with QoS functionality. For example QoS Extensions to OSPF (QoSPF) (see RFC 2676) have been proposed in which the routing architecture of OSPF is augmented to include QoS-related link metrics e.g. the amount of bandwidth available at each link. Since OSPF (and therefore QoSPF) is an intra-domain link state routing algorithm, each router in the access network stores a database of the entire topology of the domain. Each router discovers its neighbouring routers and sub-networks, and advertises its local environment to other routers in the administrative scope of the network using a reliable flooding mechanism. These advertisements are stored and updated to synchronise routing knowledge in the network. The routers in the network may operate on an explicit route basis or on a hop-by-hop basis.

When operating a QoS routing algorithm it is prudent to operate some resource reservation system. For example a Bandwidth Broker may be used to admit a Reservation Request for a packet flow to travel a certain path across the access network. The Bandwidth Broker stores a database of the network topology and link state (based on the router advertisements for example). Using the database the Bandwidth Broker can decide whether or not to accept the Reservation Request. Therefore for hop-by-hop routing, although in principle the QoS route might be changed by routers on the path as new link state information is gained, this is not practical since a new Reservation Request would need to be made to the Bandwidth Broker. Accordingly, once the route is chosen for the session the hop-by-hop route does not change until a handover is performed.

Mobility at the network layer is concerned with maintaining the routability of packet data to and from a mobile node when that mobile node moves away from its home access network The main candidate for provision of this functionality is Mobile IP (MIP), Very briefly MIP relies on a Home Agent in the home access network to tunnel IP packets to the domain where the mobile node is attached. The mobile node forms a Care-of Address (CoA) that is globally topologically correct in the network to which it is attached. The Home Agent encapsulates packets that it receives addressed to the mobile node's home address in another IP packet addressed to the CoA. In this way packet data may still reach the mobile node even when it is away from the home network. Further details of Mobile IP can be found in RFC 3344, 3775 and 3776 to which reference is specifically made.

However, when a mobile node hands over to a new access router, binding updates are triggered to the Home Agent, etc. These binding updates can introduce unwanted delays and loss of packets, and thereby degradation in performance from the user's perspective. When attached to a particular wireless access network (such as a cellular network), a mobile node may change its point of attachment (i.e. access router) quite frequently (e.g. every few minutes or more often, particularly if on the move). Each change triggers configuration of a new CoA, followed by the necessary binding updates. Doing this frequently (e.g. every few minutes) is not practical Hierarchical Mobile IPv6 (HMIPv6) has been proposed (see RFC 4140) to address this problem. HMIPv6 provides a mobility agent known as a Mobility Anchor Point (MAP) in the access network. A MAP is a logical entity that handles micro-mobility for the mobile node. Micro-mobility is a change in point of attachment of the mobile node from one access router to another, both of which are within the same domain of the access network. Whenever this happens, the mobile node sends a binding update to the MAP (comprising a new Link local CoA or LCoA), but the mobile node's primary CoA (or Regional CoA or RCoA) remains unchanged In this way the mobile node can move between access routers in the same administrative domain without having to send a binding update to the Home Agent. In contrast when the mobile node changes point of attachment to an access router in a different access network, this is a macro-mobility event i.e. requiring a binding update to be sent to the Home Agent of the mobile node When an access network operates both a mobility protocol (such as HMIPv6) and a QoS routing protocol, the requirement for all packets to pass through a particular MAP in the domain breaks one QoS route (gateway to access router and vice versa) into two. In particular, due to the high volume of traffic that it handles, it is almost certain that the MAP does not lie on the best QoS route from the gateway to the access router. Even though two QoS routes are then calculated (gateway to MAP, MAP to access router), their combination is by definition not the best QoS route if the MAP does not lie on the route that would be computed between the gateway and the access router. This causes a routing conflict between mobility on the one hand and QoS routing on the other. Thus attempts to operate both tunnelling-type mobility protocols and QoS routing protocols at the same time have not produced the performance gains that might be expected.

We have realised that this places a constraint on the scalability of the architecture In particular, as more and more mobile nodes bind to a particular MAP (e.g. if more access routers are added to the MAP's domain), it will have to handle not only the micro-mobility binding updates for the mobile nodes, but also the new QoS route computation and Reservation Requests as each mobile node moves between access routers It is believed that this network architecture is not scalable to handle both mobility and QoS for the numbers of mobile nodes present in today's cellular networks for example, nor those expected in future access networks,.

"Analysis of cross issues between QoS routing and i-mobility protocols", Friderikos, V. et al., IEE Proc.-Commun., Vol. 151, No. 3, June 2004, discusses some of the issues raised above. This document suggests that to address the conflict between tunnel-based micro-mobility protocols (such as HMIPv6) and QoS routing protocols, the path between the MAP and the AR could be lengthened by placing the mobility agent closer to the network edge (e.g. gateway). In this way it is suggested that problems associated with the two QoS tunnels mentioned above can be reduced. However, the scalability problem is not mentioned.

SUMMARY

Because of these and other problems in the art, discussed herein are systems and methods for a mobile node visiting a packet-switched wireless access network, said access network using a tunnelling-type micro-mobility protocol and a Quality of Service (QoS) routing protocol to route packet data to and from said mobile node, and comprising an access router to which said mobile node may attach, a mobility agent and a gateway, a method of configuring said access network to route packet data toward said mobile node, which method comprises the steps of (a) receiving in said access network a handover indication of said mobile node or a login request therefrom; (b) in response to said handover indication or login request computing a QoS route for said mobile node, which QoS route is useable to route packets between said mobility agent and said mobile node; (c) performing step (b) at a location in said access network remote from said mobility agent; and (d) transmitting said QoS route and said handover indication or login request from said remote location toward said mobility agent; whereby upon receipt of data transmitted in step (d) said mobility agent may handle both mobility configuration and QoS route configuration for said mobile node as part of said network layer handover. One advantage of this is that the mobility agent is relieved of QoS route computation for some or all of the mobile nodes for which it stores bindings. Furthermore, the method enables the integration of mobility and QoS into one set of signalling messages between the mobile node and the mobility agent. The computational overhead is kept at or near the edge of the network, and furthermore is performed at network nodes that do not already have a high computational overhead in comparison to the entity for which they are performing the computation. This facilitates increases in the size of the access network (in terms of number of mobile nodes attached) since QoS route computation overhead need not be placed on either the gateway or the mobility agent. In one aspect the handover indication may comprise a Handover Request from the mobile node.

The method may be performed when the mobile node transmits a login request to the access network (e.g. to start a session), and also when the mobile node undergoes a macro mobility event (e.g. change in care-of address requiring binding updates to the Home Agent and any correspondent nodes) or a micro mobility event (e.g. change from one access router to another within the same domain of the mobility agent.

The method may be performed at a network node where there is another mobility agent. For example, it is generally preferred to keep computational overhead away from (in order) the gateway and from the or each mobility agent (e.g. MAP) in the access network. Accordingly, the or each MAP may perform the functionality of the invention on behalf of the mobility agent at the gateway. If there is more than one MAP, this helps to distribute the computational load still further. The functionality of the invention is then performed at one or more access router on behalf of each mobility agent at each MAP in the domain. In this way, wherever the mobility agent is located the computational overhead associated therewith is performed at a remote location e.g. pushed further 'down' the network toward the mobile node or 'outwards'0 toward its edge. Preferably, the computational overhead is distributed at more than one remote location.

The tunnelling-type micro-mobility protocol may be HMIPv6, or any similar protocol similar, or any protocol derived from HMIPv6. The Quality of Service (QoS) routing protocol may be QoSPF, or any similar protocol similar, or any protocol derived from QoSPF.

Advantageously, said remote location is in a routing sense between said mobility agent and said mobile node, whereby computational overhead associated with QoS route computation is moved toward the edge of said access network. In this way computational overhead is always nearer the edge of the access network than the logical entity (e.g. gateway, MAP) that requires the computed QoS route. A further advantage is that when the computation (that would be performed by a single network node) is performed at or near the edge of the access network, the overhead can be split between a number of network nodes. This greatly facilitates the scalability of the network architecture.

Preferably, said remote location comprises an edge of said access network. The edge of the access network may be defined by a routing area for example and there may be one or more routing areas in the access network.

Advantageously, said edge comprises said access router to which said mobile node is to be handed over and said mobility agent comprises a router functioning as a Mobility Anchor Point or similar, whereby said method computes a QoS route between said Mobility Anchor Point and said access router.

Preferably, said remote location comprises a router functioning as a Mobility Anchor Point and said mobility agent comprises said gateway to said access network, whereby said method computes a QoS route between said gateway and said Mobility Anchor Point.

Advantageously, in response to said handover indication and receipt of said QoS route, said mobility agent reserves resources for said QoS route in said access network and updates a mobility cache stored in memory on behalf of said mobile node, which mobility cache causes packet data received at said mobility agent destined for said mobile node to be routed toward said remote location.

Preferably, the method further comprises the step of said mobility agent storing a routing configuration for said mobile node, which routing configuration causes said packet data to follow said QoS route toward said remote location.

Advantageously, the method further comprises the step storing a source routing configuration for said mobile node, whereby said packet data is routed with a source routing option toward said mobile node via said remote location.

Preferably, said access router is a target access router within a different mobility agent domain to said other access router, said method further comprising the steps of indicating that a handover must also take place from said mobility agent to a new mobility agent, said handover of said mobile node comprising the following phases: (i) performing network layer handover of said mobile node to said target access router and (ii) performing network layer handover from said mobility agent to said new mobility agent.

Advantageously, phase (i) comprises said target access router computing a QoS route from said mobility agent to said target access router, and forwarding said QoS route to said new mobility agent, and upon receipt of said QoS route said new mobility agent forwards said QoS route to said mobility agent, whereby said mobility agent updates a mobility cache so that packets for said mobile node are routed to said target access router outside the domain of the mobility agent.

Preferably, phase (i) further comprises the steps of said mobile node receiving a Router Advertisement from said target access router, which Router Advertisement comprises an identity of said new mobility agent, whereupon said mobile node stores an indication that a mobility agent handover is required, and following completion of phase (i) said mobile node transmits toward said new mobility agent said handover indication further comprising data for triggering mobility agent handover. The data may be carried in the header or payload of the handover indication, and may comprise the Care-of Address (RCoA) used by the mobile node at the current mobility agent. On examining the RCoA the access network may determine the topological location of the current mobility agent whereby a QoS route can be determined between that location and the target access router. In one embodiment the handover indication comprises a Handover Request type message.

Advantageously, the method further comprises the steps of said target access router intercepting said handover indication, computing a QoS route between said new mobility agent and said target access router, and forwarding said QoS route and said handover indication toward said new mobility agent.

Preferably, upon receipt of data forwarded from said target access router, said new mobility agent communicates with said mobility agent to obtain a QoS context for said mobile node. This may be achieved using the Context Transfer Protocol for example.

Advantageously, upon receipt of data forwarded from said target access router, said new mobility agent computes a QoS route between said gateway and said new mobility agent, and forwards said QoS route and said handover indication toward said gateway.

Preferably, following completion of phases (i) and (ii) said method further comprises the steps of routing packets addressed to said mobile node along said QoS route between said gateway and said mobility agent, and along said QoS route between said mobility agent and said target access router.

Advantageously, step (a) comprises intercepting at said access router a Handover Request message from said mobile node destined for said mobility agent, interception of said Handover Request triggering steps (b)-(d) in said access network.

Preferably, said Handover Request is sent from said mobile node in response to a trigger from said access network.

Advantageously, said QoS route comprises a source and a destination in said access network, and said remote location is the destination of said QoS route.

Preferably, said QoS route is in a downlink sense across at least a part of said access network.

Advantageously, said QoS route is pre-computed.

According to another aspect of the present invention there is provided a packet-switched wireless access network configured to perform any of the access network method steps set out above.

According to another aspect of the present invention there is provided a router comprising a memory storing computer executable instructions that when executed perform any of the mobility agent method steps set out above.

According to another aspect of the present invention there is provided an access router comprising a memory storing computer executable instructions that when executed bring perform any of the access router method steps set out above.

According to another aspect of the present invention there is provided a mobile node comprising a memory storing computer executable instructions that when executed perform the mobile node method steps set out above. By way of example the mobile node may be a mobile or cellular telephone, a PDA, a hand-held games console, a digital media player, a laptop or notebook computer, or any combination of the aforesaid. In another aspect the mobile node may be a mobile router.

According to another aspect of the present invention there is provided a method of manufacturing a mobile node, which method comprises the steps of storing in a memory of said mobile node computer executable instructions that when executed perform the mobile node method steps set out above

BRIEF DESCRIPTION OF THE DRAWINGS

For a better understanding of how the invention may be put into practice, preferred embodiments of the invention applied in a heterogeneous network environment comprising three access networks will be described, by way of example only, with reference to the accompanying drawings, in which.

DESCRIPTION OF PREFERRED EMBODIMENT(S)

The following description illustrates by way of example and not by way of limitation.

Figure 1:
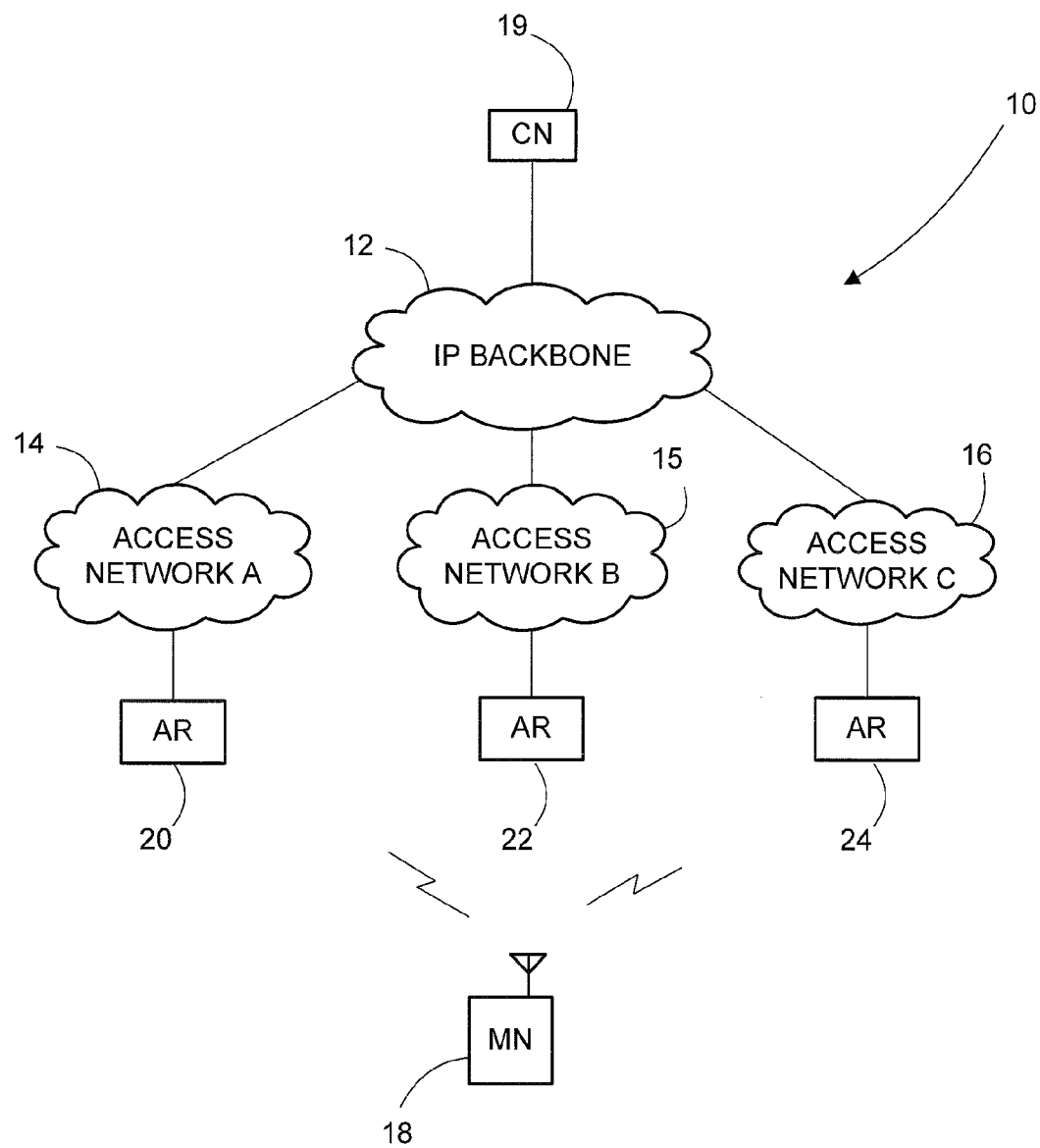
FIG. 1 is a schematic block diagram of a network environment comprising three access networks, each having the functionality of the invention and which provide access to the Internet or other IP backbone network for mobile nodes.

Referring to FIG. 1 an IP-based (IPv4 or IPv6 or a mixture thereof may be used in any of the networks mentioned herein) network environment generally identified by reference numeral 10 comprises an IP backbone 12 having a number of interconnected routers that provide access for network nodes to data and services stored on remote servers for example. As such the IP backbone 12 may form part of the Internet. In this embodiment any three IP-based access networks 14, 15, 16 provide access for a wireless mobile node (MN) 18 to the IP backbone 12, although there may be any number of access networks and mobile nodes of course. The access networks 14, 15, 16 may be an IP-based cellular network (such as 3GPP Release 5 or 6, UMTS Long Term Evolution (LTE) or any future IP-enabled cellular network) or the combination of an ISP and a number of WLAN routers for example. Access to the IP backbone 12 enables the MN 14 to communicate with a correspondent node (CN) 19. The CN 19 may be a media server, a web server or another mobile node for example.

The MN 18 is physically separate from the access networks 14, 15, 16 but may communicate with one or more of them by means of a wireless link. Each access network 14, 15, 16 comprises an IP-enabled access router 20, 22, 24 that is a single hop (at the network layer) from the MN 18. Each access router 20, 22, 24 is connected to a wireless transceiver such as Node B or WLAN router for example.

Each access network 14, 15, 16 defines an administrative domain comprising a number of interconnected router's; therefore the domain is scoped so that at the edges of the network administration packets (such as link-state advertisements are dropped). Furthermore each access network 14, 15 and 16 and the MN 14 is able to operate Mobile IPv6 (MIPv6—see RFC 3775) and Hierarchical Mobile IPv6 (HMIPv6) as described in RFC 4140, or any functionally similar protocols. Both of these RFCs are fully incorporated herein by reference for all purposes. Thus each access network 14, 15, 16 comprises one or more router having the functionality of a mobility agent (or Mobility Anchor Point (MAP) in the terms of RFC 4140). The MAP is used by the MN 18 as a local Home Agent so that handovers between access routers in the same domain do not trigger a binding update to the Home Agent of the MN 18. The domain of each MAP is defined by the access routers that advertise the MAP information to attached MNs. As such there may be more than one MAP per access network.

Figure 2:
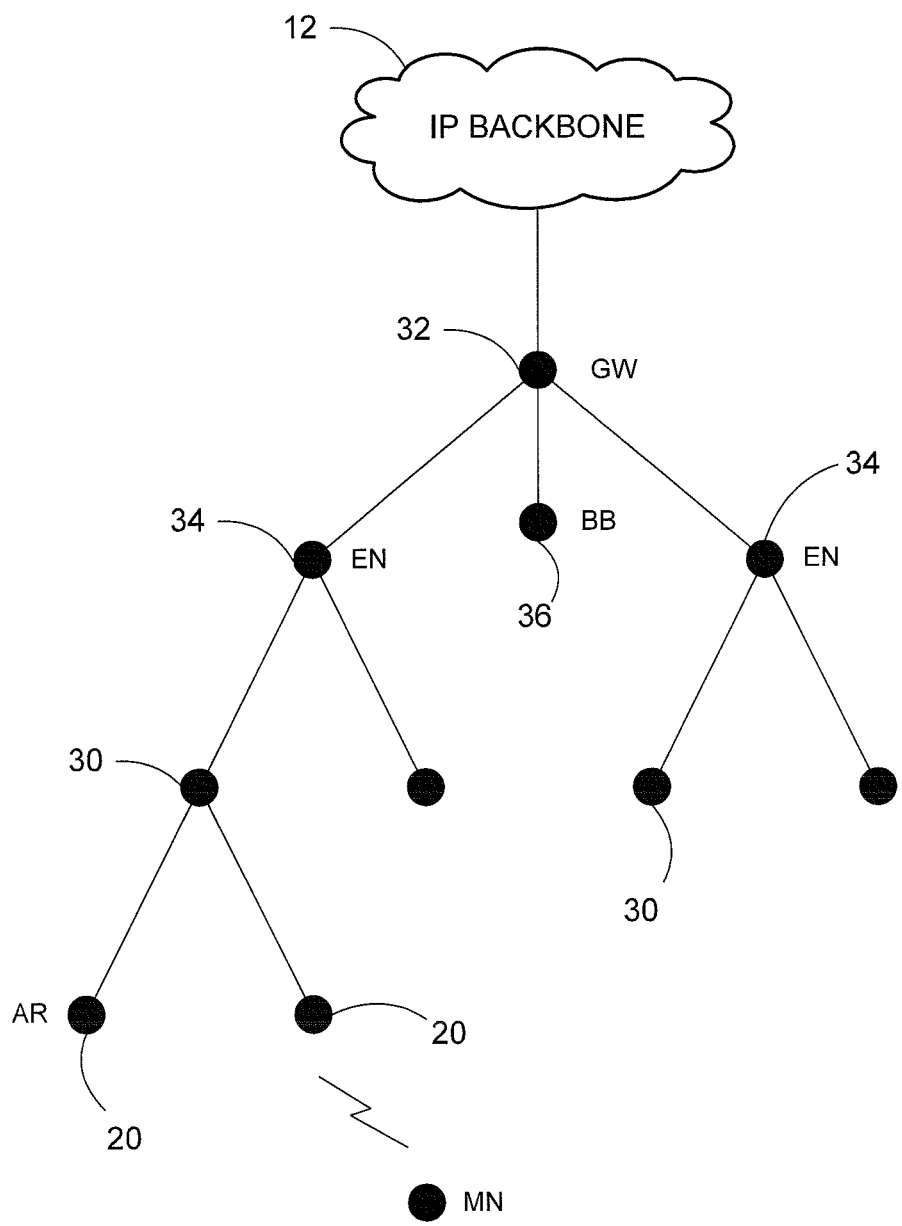
FIG. 2 is a schematic block diagram of one of the access networks in FIG. 1.

Referring to FIG. 2 the access network 14 comprises a number of interconnected routers 30. A gateway router (GW) 32 is the only entry and exit point of the access network 14 for packet traffic to and from the IP backbone 12. Two mobility agents hereinafter referred to as Enhanced Nodes (EN) 34, 36 are each similar to a MAP as described in RFC 4140 but comprise the functionality described herein. It is possible for any of the access networks to have any number of ENs, each located at any point in the network.

Each router 30 is Diffserv-capable (see e.g. RFC 2475) and each operates an intra-domain link-state QoS routing algorithm, for example QoSPF as described in RFC 2676; that document describes an extension to the Open Shortest Path First (OSPF) routing algorithm The extension enables distribution of QoS information (e.g. link state) amongst all router's in the domain of the access network 14 so that they can each maintain a database of network topology and determine accurate and consistent QoS routes.

The access network 14 also comprises a Bandwidth Broker (BB) 36. The BB 36 is a logical entity that is stored and executed on a network node within the domain. Further details of the architecture and function of Bandwidth Brokers can be found in "A Discussion of Bandwidth Broker Requirements for Internet Qbone Deployment", Neilson, R. et al., August 1999 to which reference is specifically made, hereinafter referred to as Neilson. For example the BB 36 may function on the gateway GW 32 in the access network 14, or it may reside on a physically separate network node. The purpose of the BB 36 is to manage the QoS resources within a domain based on the Service Level Specifications (SLSs) that have been agreed in that domain (intra-domain communication), and to manage communication with other BBs in different domains (inter-domain communication). In this case, the BB 36 is responsible for the QoS resources in the access network 14,. Given a specific QoS request by a user or other BB, a BB determines whether or not the requested QoS can be met by network nodes (usually routers) within the domain from one gateway in the domain to another. Each BB has access to the routing table of the network node on which it resides; accordingly by means of link state advertisement discussed in RFC 2676 it is aware of the QoS level (e.g. bandwidth) available over all links in its domain.

Figure 3A:
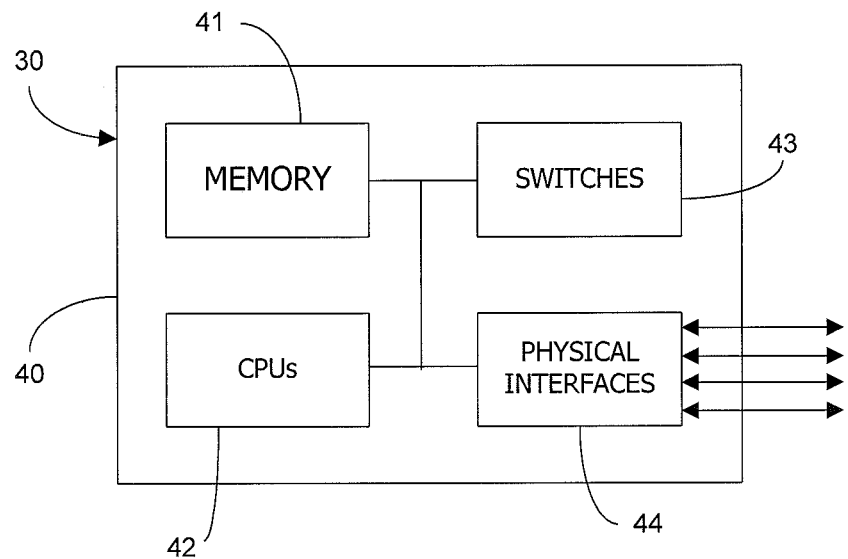
FIG. 3A is a schematic block diagram of computer hardware for storing and operating logical entities according to the present invention.

Referring to FIG. 3A one of the routers 30 comprises a housing 40, a memory 41, one or more CPU 42, switches 43 and physical interfaces 44. The physical interfaces 44 enable communication over a wired or wireless physical link with other routers 30 in the access network 14. The memory 41 may store computer executable instructions that when executed bring about the functionality of the various logical entities described herein, e.g. AR 20, GW 32, EN 34 and BB 36.

Figure 3B:
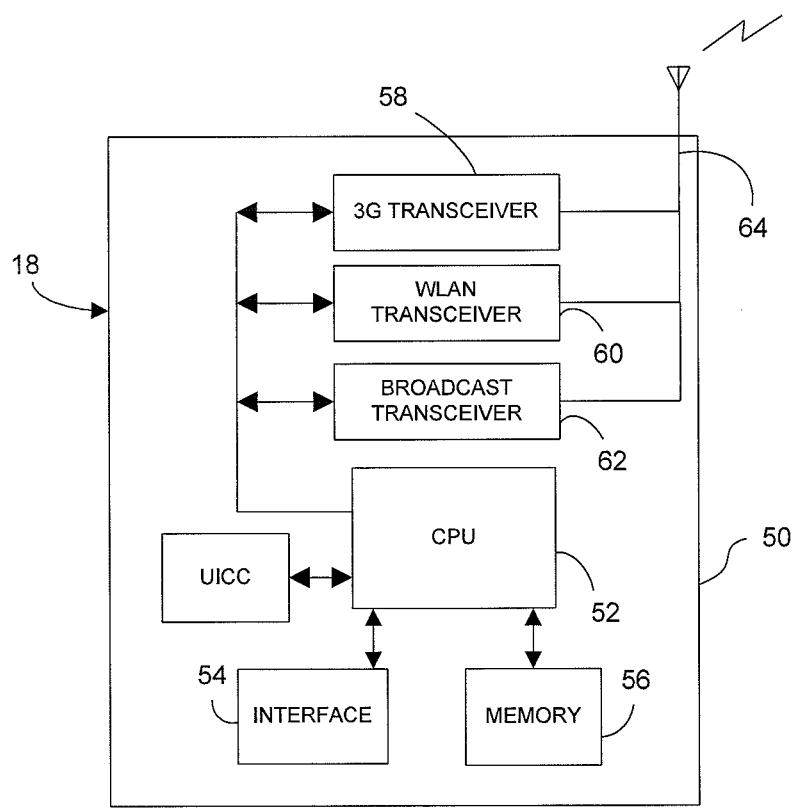
FIG. 3B is a schematic block diagram of a mobile node according to the present invention.

Referring to FIG. 3B the MN 18 comprises a case 50 housing a CPU 52, an interface 54, a computer memory 56, a 3G transceiver (or interface) 58, a WLAN transceiver (or interface) 60 and a broadcast transceiver (or interface) 62. The 3G transceiver 58 and the broadcast transceiver 62 are wired to an antenna 64 for reception and transmission of data with a mobile network and for reception of data from a broadcast network respectively. The WLAN transceiver 60 enables reception and transmission of data with wireless access points. The CPU 52 interfaces with all of the aforementioned components to process (store, access, etc.) electronic data. The memory 56 stores computer executable instructions that when executed by the CPU 44 perform the mobile node method steps as described herein. These computer executable instructions may be stored in the memory of the mobile during manufacture. It is to be noted that it is not essential for the mobile node to be multi-mode; the invention also has application for mobile nodes with only one interface.

There are various functions that the access network 14 must perform on behalf of the mobile node 18 if QoS and mobility are to be supported. The access network 14 must be able to support login requests from the MN 18. Such login requests include making bindings in one or more mobility cache for the MN so that packets can be routed successfully to and from it. The access network 14 must also facilitate handover of the MN 18 from one access router to another, and from one EN 34 to another EN.

Login Phase

Figure 4:
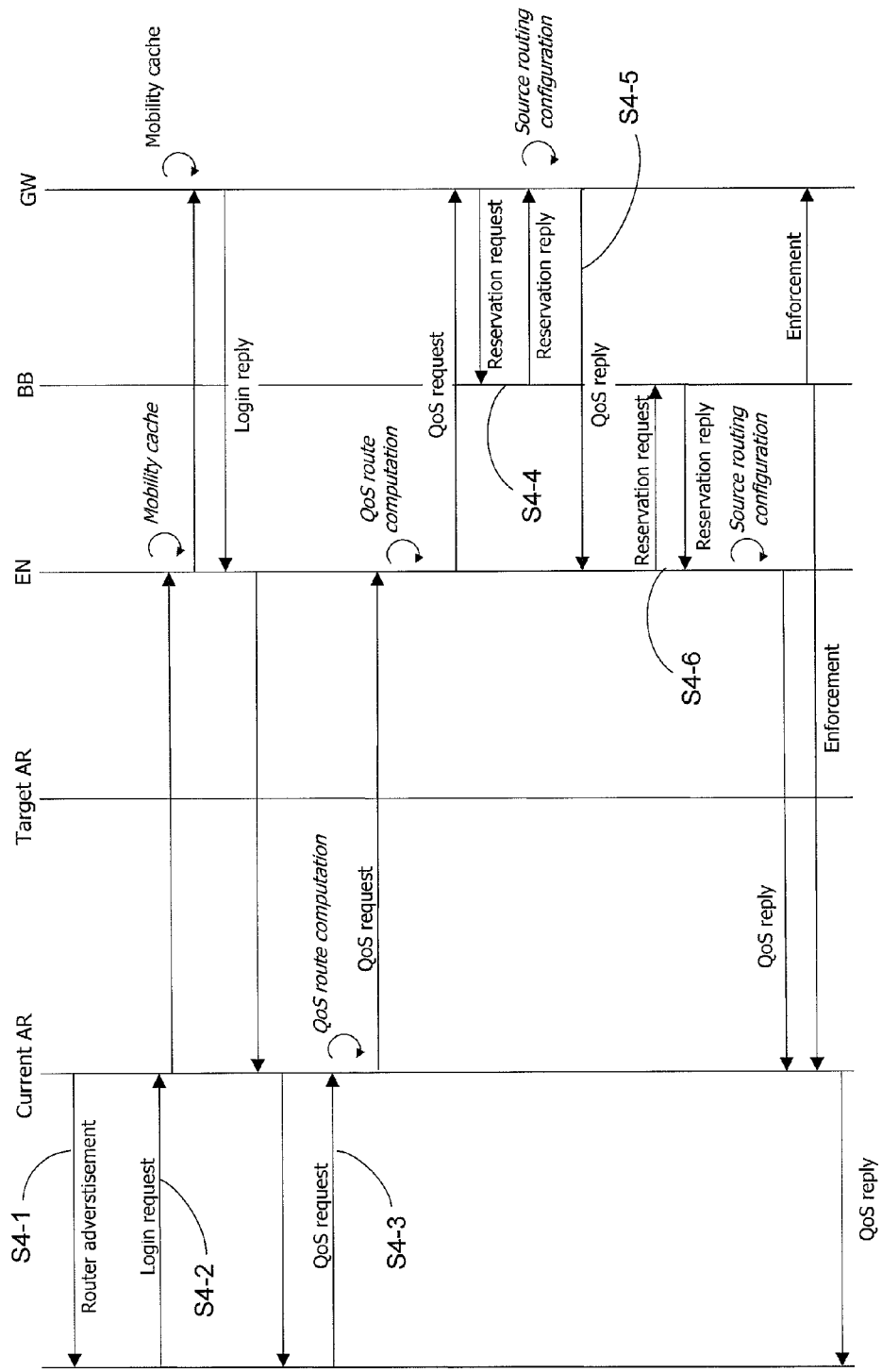
FIG. 4 is a signalling diagram of a login and session request phase of a method according to the present invention.

Referring to FIG. 4 when the MN 18 wishes to attach to the access network 14 (e.g. when the user moves it into the area of coverage of a Node B, or when the user switches the MN 18 on) it either awaits receipt of or solicits a Router Advertisement (step S4-1) from an access router, in this case access router 20. The Router Advertisement comprises a MAP option that provides details of the EN (distance vector from the MN, preference for the particular EN, the EN's global IP address and subnet prefix). The MN 18 uses this data to auto-configure a care-of address and to log on to the access network at step S4-2. To do this the MN 18 follows the procedure described in RFC 4140 to which reference is specifically made in this respect (see in particular section 6.1). This process establishes the necessary mobility cache in the EN 34 and GW 32 respectively. In the mobility cache of the GW 32 a binding made for the MN 18 so that IP packets addressed by CNs to the MN's Regional Care-of Address (RCoA) are tunnelled to the EN 34. In the mobility cache of the EN 34 a binding is created between the RCoA and an On-Link Care-of Address (LCoA). The LCoA is an IP address configured by the MN 18 using the prefix advertised by the access router 20; the LCoA is not used for communication with any CN 16, but it used to tunnel packets from the EN 34 to the MN 18. Once logged on the access router 20 becomes the Current AR 20 of the MN 18.

At step S4-3 the MN 18 wishes to start a session (e.g. web-browsing, VoIP, etc.). To that end it sends a QoS Request toward the EN 34 containing inter alia the Service Level Specification (SLS) requested by the user which includes the DiffServ Code Point (DSCP) required (or requested). The Current AR 20 intercepts the Request and using its link state database pre-computes an explicit QoS route (i.e. end-to-end) from the EN 34 to itself i.e. in the downlink direction. The algorithm used to pre-compute the route follows that described in QOSPF (see RFC 2676 and Appendix D of that document). Once the QoS route is computed, the QoS Request and QoS route are forwarded to the EN 34 together with the list of routers on the pre-computed route.

Upon receiving the QoS Request the EN 34 stores in memory the pre-computed QoS route to the current AR 20. The EN 34 then pre-computes (using the same method as the Current AR 20) a QoS route from the GW 32 to the EN 34 and forwards the QoS Request to the GW 32, together with the list of routers on the QoS route. The pre-computation of the route (from the GW 32 to the EN 34) at this stage may be omitted completely, dependent on the dynamics of the access network 14; for example the network capacity between the GW 32 and EN 34 may not present a bottleneck, so QoS routing between these two nodes may not be required all of the time (or indeed at all). Alternatively, the pre-computation may take place at the GW 32 if the network operator prefers.

The GW 32 then sends the pie-computed QoS route and requested DSCP to the BB 36 of the domain in the form of a Reservation Request at step S4-4. Communication between the GW 32 and BB 36 may take place using the COPS protocol (RFC 2748). The BB 36 makes a decision to accept or refuse the request (e.g. based on policies of the access network operator) and sends a reply to the GW 32. If the result of the Reservation Request is not successful, the DSCP of the session can be downgraded to a lower class and another attempt made.

Assuming that the reservation is successful, the GW 32 then configures itself to route packets to the EN 34 using the pre-computed QoS route and DSCP. In order to ensure that the pre-computed route is followed by packets to the EN 34, the GW 32 uses source routing: this list of router's to be traversed is added to each forwarded IP packet using an extension header. In IPv6 this option is available in the routing header under the routing type field; furthermore each address present in the header can be strict or loose according to the preference of the network administrator. Once this is complete a QoS Reply is sent from the GW 32 to the EN 34 at step S4-5. The QoS Reply comprises the current DSCP (i.e. that negotiated by the GW 32 with the BB 36—which might be different to that requested) and the negotiated SLS; if the reservation by the GW 32 is lower than that requested by the MN 18 the lower DSCP is used for the current session, but the requested DSCP may be stored in memory for a subsequent request.

At step S4-6 the EN 32 now sends a Reservation Request to the BB 36 for the pre-computed QoS route from the EN to the Current AR 20 and for the DSCP assigned for the session in the QoS reply. Assuming successful, the EN 34 configures itself to route packets to the Current AR 20 using the pre-computed QoS route. The EN 34 also uses source routing to ensure that the pre-computed route is followed. The BB 36 may decide to downgrade the DSCP at this stage.

The combination of QoS routes pre-computed at the edges of the access network 14 and the use of source routing enables the method to be scaled for access networks of a wide variety of sizes (in terms of number of routers). This is because route computation is performed at the edges of the network by only a few network nodes, allowing the functionality of other routers in the access network to remain comparatively simple.

After configuration of the EN 34, it sends a QoS Reply message to the Current AR 20 that comprises the DSCP and an indication that the original QoS Request is accepted. The QoS Reply is intercepted by the Current AR 20 which then updates its source routing configuration (downlink direction) for the MN 18. Following this the QoS Reply is forwarded to the MN 18 which can then commence the session using the assigned DSCP Either at this point or when the login request was received, the current AR 20 may also pre-compute a QoS route from itself to the EN i.e. in the uplink direction. The steps of the method may then be repeated in order to reserve the necessary resources (between AR 20 and EN 34, and EN 34 and GW 32).

This procedure is repeated for each session started by the MN 18. Differentiation between a number of sessions for a single MN is made on the basis of source and destination port numbers.

Handover Preparation

Figure 5:
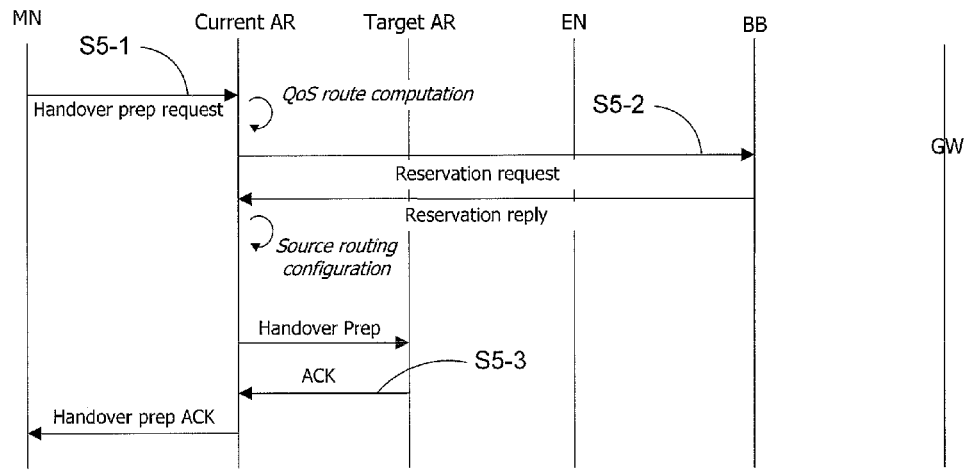
FIG. 5 is a signalling diagram of a handover preparation phase of a method according to the present invention.

This phase of the method is optional, but is advantageous insofar as it aims to reduce handover delay at the network layer. It may become beneficial or necessary for the MN 18 to handover from the Current AR 20 to a new AR in the same or a different MAP domain. Referring to FIG. 5, and assuming that a target AR has been selected (e.g. using some mechanism such as signal strength at the MN 18, or the access network 14 forcing the MN 18 to handover for example), the MN 18 sends the current AR 20 a Handover Preparation Request message at step S5-1; this message comprises an identity of the MN 18, the IP address of the target AR (obtained from the Router Advertisement) and QoS parameters. This message may be based on the HPREP message described in section A3.5.2 of "BRAIN architecture specifications and models, BRAIN functionality and protocol specification", IST-1999-10050 BRAIN D2.2 (hereinafter 'BRAIN') to which reference is specifically made. The QoS parameters in the message may be dependent on the QoS scheme used. In the case of DiffServ the parameters are the DSCP and the IP addresses of the user sessions, together with other Diffserv filter parameters such as the maximum allowable throughput, etc. Upon receipt, the current AR 20 pre-computes an explicit QoS route (using the same method described above) from the current AR 20 to the target AR, based on the DSCP already assigned to the MN 18. This is to ensure that links on the selected path can meet the bandwidth requirements of the assigned DSCP. At step S5-2 the current AR 20 sends a Reservation Request to the BB 36 for the pre-computed QoS route. The Reservation Request comprises the pre-computed QoS route and the SLS (containing the current DSCP for the session) of the MN 18 as stored at the current AR 20. Assuming that the BB 36 admits the request it sends a Reservation Reply to the current AR 20. Upon receipt of a positive reply, the current AR 20 configures a source routing configuration for the MN 18 so that packets will be forwarded to the target AR. The source routing configuration is not yet enforced as the MN 18 is still attached to the current AR 20 and handover has not yet taken place. There is no DiffServ reconfiguration of edge routers since the new QoS route (current AR to target AR) is for downlink packets only.

At step S5-3 the current AR 20 forwards the Handover Preparation message to the target AR. The target AR replies with an Acknowledgement message that it is able to receive the MN 18 should handover take place subsequently.

When the MN 18 actually determines that a handover is necessary the QoS route stored at the current AR 20 can be used to tunnel packets toward the new AR. In particular a mechanism similar to that described in Appendix A of RFC 4140 (to which reference is specifically made in this respect) can be used to perform a Fast Mobile IPv6 handover. The MN 18 should send a Fast Binding Update (F-BU) to the current AR 20. The current AR 20 may then use the QoS route to tunnel packets to the new AR until handover is completed. The tunnel is removed once handover is completed.

Handover Execution

After discovering one or more nearby access points, the MN 18 sends Router Solicitation for Proxy Advertisement (RtSolPr) message (see RFC 4068—a message from the MN to the AR 20 requesting information for a potential handover) to resolve access point identifiers (i e a link-layer address) to subnet router information. The AR 20 responds with a Proxy Router Advertisement (PrRtAdv) message that provides information about neighbouring links. This message can also be used as a trigger for network-initiated handover. It is convenient to send the RtSolPr message after performing router discovery. However, the MN 18 can send a RtSolPr at any time, e.g., when one or more new access points are discovered. The MN 18 can also send RtSolPr more than once during its attachment to the AR 20. The trigger for sending a RtSolPr message can originate from a link-specific event, such as the promise of a better signal strength from another access point coupled with fading signal quality with the current access point. Such events are often broadly referred to as "L2 triggers" and they serve as an event to invoke a handover. For instance, when a "link up" indication is obtained on the new link, protocol messages (e.g., FNA) can be immediately transmitted.

Following determination (either by the MN 18 or by the access network 20) that network layer handover is necessary or desirable, there are two possibilities to consider for the MN 18 to be handed over from the current AR 20 to the target AR:

(1) the target AR is within the domain of the EN 34 (i.e. it sends Router Advertisements with a MAP option containing details of the EN; or (2) the target AR is not within the domain of the EN 34.

In case (2) it is necessary for the EN 34 to change in addition to the change of access router i.e. this is a macro mobility event.

Scenario (1)

Figure 6:
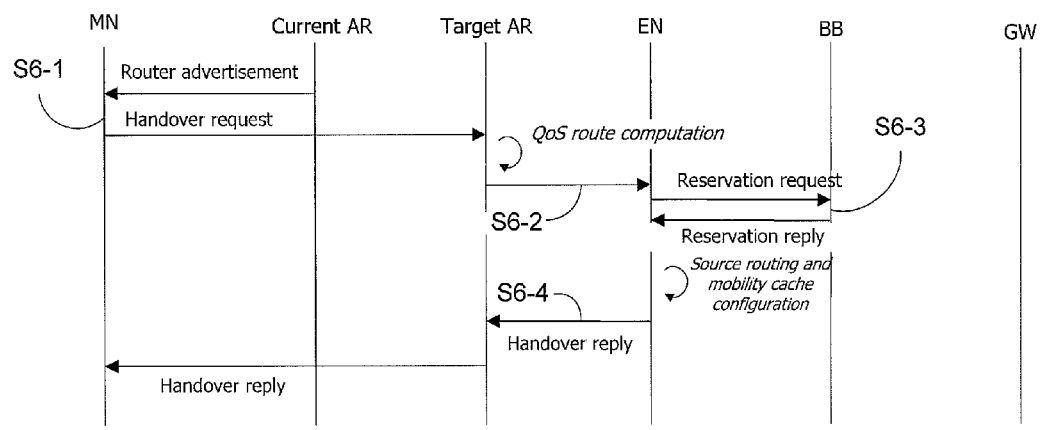
FIGS. 6 and 7 are signalling diagrams of different handovers according to the present invention.
Figure 7:
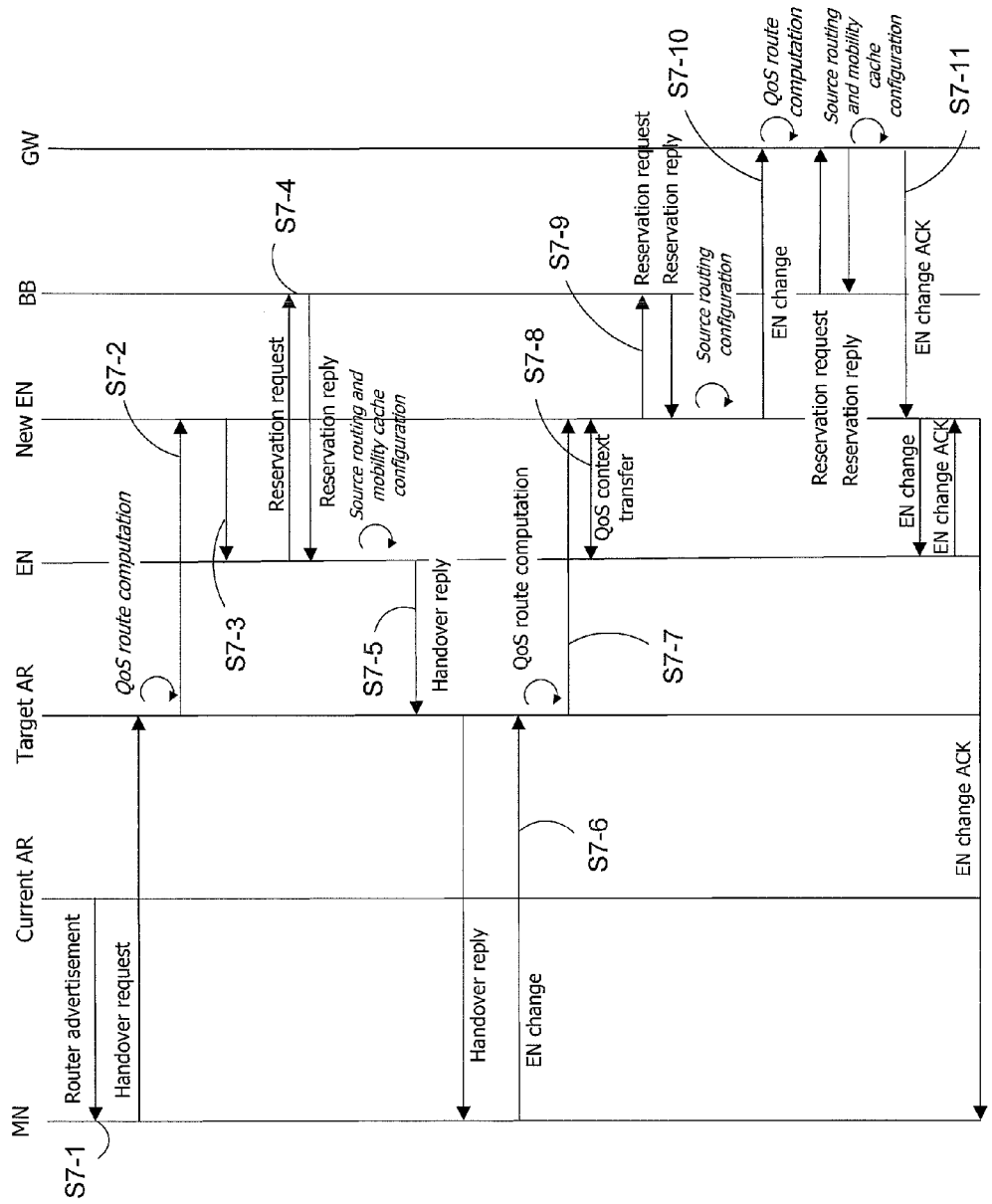

FIG. 6 shows the signalling in case (1). At step S6-1 the MN 18 receives a Proxy Router Advertisement from the current AR 20. As well as the standard data (e.g. MAP option) the Proxy Router Advertisement comprises the SLS (e.g. DSCP for the or each current session) initially requested by the MN 18 before the or each session commenced. If another access router is selected for handover (e.g. by the MN 18 or by the access network), it becomes the target AR for the purposes of this example. In that case, the MN 18 sends a Handover Request for each session to the target AR using the relevant details contained in the Router Advertisement. Since each session has negotiated a QoS from the BB 36, handover takes place per session. A session may be identified by destination and source IP addresses and port numbers so that they are not confused at the new AR. The Handover Request message may (as may any mentioned herein) be based on the HOFF message described in the BRAIN document in section A3.5.3.

In this scenario the details of the EN 34 in the MAP option match the details of the EN 34 with which the MN 18 is already associated. Upon receipt of the Handover Request, the target AR pre-computes a QoS route from the EN 34 to the target AR (i.e. in the downlink direction) based on the current DSCP assigned to the flow, and at step S6-2 forwards the Handover Request (comprising the QoS route) to the assigned EN 34. If the network topology between the EN 34 and the target AR is such that the current DSCP cannot be maintained, the QoS route computed should be that offering the closest available to the current DSCP.

The target AR forwards the Handover Request and QoS route to the EN 34. Upon receipt of the Handover Request the EN 34 checks if it has a binding entry for the MN 18. In particular the MN 18 should have configured a Care-of Address using the network prefix in the MAP option—this is the MN's 'Regional Care-of Address' (in the terms of RFC 4140) to which packets are sent by the MN's Home Agent. To this end the EN 34 can check whether the network prefix part of the MN's address matches its prefix. Assuming that the MN 18 is attached to that EN 34, there is no need for an EN change and the present EN can continue to handle mobility for the MN 18.

At step S6-3 the EN sends a Reservation Request to the BB 36, this request may or may not comprises the current DSCP depending on the results of the QoS route computation performed by the target AR. In particular, a lower DSCP may need to be assigned to the session if the path from EN 34 to the target AR cannot meet the desired bandwidth requirements. Assuming that the Request is accepted (for either the current or another DSCP), a Reservation Reply is sent to the EN 34. The EN 34 then configures the source routing and mobility cache for the MN 18. For example, the EN 34 will update the binding entry for the MN 18 to point toward the target AR and will store therewith the list of routers forming the pre-computed QoS route to the target AR. In this way packets of the session destined for the MN 18 can be tunnelled to the target AR with a source routing option comprising the list of routers.

Assuming also that the current DSCP can be maintained, there is no need for reconfiguration of the DiffServ edges (i.e. target AR, EN 34 and GW 32) by the BB 36 Instead the target AR can be configured by QoS context transfer from the current AR 20 to the target AR using the methodology described in the RFC 4067 ("Context Transfer Protocol"). However, if the DSCP cannot be maintained on the new route, the edge routers should be re-configured with the new DSCP assigned to the session.

Finally at step S6-4 a Handover reply is sent to the MN 18 from the EN 34 via the target AR. It is possible that the tunnel (as described under 'Handover Preparation' above) may be used during the handover to reduce the chance of loss of packets tunnelled from the EN 34 to the current AR 20.

This procedure is repeated for each session that the MN 18 has ongoing and that it wishes to continue via the target AR. Accordingly the MN 18 sends a number of Handover Request messages to the target AR equal to the number of ongoing sessions that it has.

Scenario (2)

In this scenario the target AR is not part of the domain of the EN 34 (although it may or may not be part of the administrative domain of the access network 14) and therefore and EN change is necessary as part of the handover process. The MN 18 may determine this by comparing the MAP option in the Router Advertisement from the target AR with the MAP option from the current AR. Network layer handover takes place in two stages: access router handover, followed by EN handover, assuming the first stage is successful. It is assumed that the MN 18 has already successfully achieved L2 handover to the target AR. IP packets of ongoing session(s) of the MN 18 can be tunnelled from the AR 20 to the target AR using, for example, using Fast Handovers (as described in Appendix A of RFC 4140). A change of EN 34 means that the MN 18 will auto-configure a new RCoA using the network prefix advertised in the MAP option of the router advertisement from the target AR. Therefore the MN 18 will have to sending binding updates to its Home Agent, and possibly some Correspondent Nodes if using Route Optimisation. Therefore, following L2 handover, the EN handover may be delayed until the MN 18 deems it suitable (or is forced) to perform network layer handover.

Once it is determined that network layer handover is to take place, the initial steps of the method in this scenario are the same as scenario (1), except that when the target AR receives the or each Handover Request it pre-computes a QoS route from the current EN 34 to itself (rather than from the new EN to itself). This enables the current EN 34 to forward packets to the target AR once handover is completed, as explained in more detail below. In order to be able to pre-compute the QoS route, the target AR must discover the identity of the current EN 34 (outside the MAP domain in which the target AR resides) to which the MN 18 is attached. To that end the MN 18 may be configured to send extra data in the Handover Request compared to the Handover Request in Scenario (1). This extra data is the current RCoA that the MN 18 auto-configured using the MAP option advertised by the old EN 34 ('current RCoA'). Alternatively the target AR may encapsulate the Handover Request in one or more IP packet with a source address of the current RCoA and then tunnel these packets to the target AR using the correct LCoA of the target AR. In another alternative the Handover Request may be based on the HOFF message in BRAIN and therefore comprises a session id field has details of the MN's current EN. In any case the target AR reads the current RCoA and extracts the network prefix. Each EN will not be on the same subnet and therefore each will have a different prefix. Accordingly the target access router can pre-compute the QoS route from the subnet of the current EN 34 to itself using the routing tables it has compiled and stored from link-state advertisements.

Having computed the QoS route the target AR forwards the Handover Request message, together with the QoS route, to an EN at step S7-2: however, it is sent to a different EN ('new EN') because the target AR is in a different MAP domain to the current EN 34. The new EN recognises that the source address of the QoS route is not one of its interfaces and therefore forwards the Handover Request to that interface (i.e. the current EN 34) at step S7-3 together with the pre-computed QoS route from the current EN to the new EN.

At step S7-4 the current EN 34 sends a Reservation Request to the BB 36 for resources to be reserved for the pre-computed QoS route and DSCP (the DSCP may be the current DSCP or a new DSCP, for example if the current DSCP is not that originally requested by the MN 18 when establishing the session). Assuming that the BB 36 admits the Request, the EN 34 configures source routing and makes a binding entry in the mobility cache for the MN 18. At this point the current EN 34 is able to forward packets for the MN 18 to the target AR along the QoS route pre-computed by the target AR.

The EN 34 then forwards a Handover Reply message to the MN 18 via the target AR at step S7-5. Receipt of this message by the MN 18 triggers it to send an EN Change message to the target AR at step S7-6; the function of this message is to enable the new EN to handle mobility for the MN 18 within its MAP domain. Upon receipt of the EN Change message the target AR pre-computes a QoS route from the new EN to itself At step S7-7 the QoS route is sent to the new EN together with DSCP of the session. The new EN then retrieves the QoS context (comprising the SLS) from the EN 34 using the Context Transfer Protocol (RFC 4067) or similar at step S7-8. At step S7-9 the new EN sends a Reservation Request to the BB 36 to trigger resource reservation and DiffServ edge configuration. The latter may occur of the DSCP change is requested for example; whether or not this change is admitted is dependent on the policy management at the BB 36 and the available resources on the QoS route (GW 32→new EN, and new EN→target AR).

Assuming that the Reservation Request is admitted, the new EN configures the source routing for the MN 18 (no binding update is necessary due to the earlier QoS context transfer). At step S7-9 the new EN forwards the EN Change message to the GW 32; upon receipt of the message the GW 32 pre-computes a QoS route from the GW 32 to the new EN and sends a Reservation Request to the BB 36 at step S7-10. Assuming the request is admitted the GW 32 configures the source routing for packets to be tunnelled from the GW 32 to the new EN and updates its binding entry for the MN 18 to show it is attached to the new EN. At step S7-11 an EN Change ACK message is then sent to the new EN. This triggers the new EN to advise the EN 34 that EN change has taken place. Finally the new EN sends a EN Change ACK message to the MN 18 via the target AR to confirm the same. The MN 18 may then safely release its binding with the previous EN 34.

In accordance with RFC 4140 the MN should advise its Home Agent (and any Correspondent Nodes if using Route Optimisation) of it's new RCoA so that packets can be routed to the new EN. The RCoA should have been configured by the MN 18 upon receipt of the Router Advertisement that comprises the MAP Option and therefore the 64-bit network prefix of the new EN's subnet.

This method of the invention facilitates distribution of the load of computing QoS routes within the access network, and moves this load toward the edge of the access network. In one aspect this edge comprises one or more access router; in another aspect QoS route computation may be performed by one or more MAP on behalf of a gateway to the network domain. This has the further advantage that an access network according to the invention is able to operate a QoS protocol such as DiffServ which requires that computational complexity is kept at the edge of the network and that core routers have comparatively simple functionality. Furthermore this facilitates scalability compared to a method in which only one node is performing all QoS routing and mobility calculations.

It is to be noted that the invention provides for computation of several QoS routes (e.g. GW→EN and EN→AR). It is envisaged that both of these routes may be computed at the access router if the EN and gateway are in the same routing area for example; in that case the access router has knowledge of the appropriate topology. This choice is implementation specific and left to the network operator. It is also possible that the step of computing a route from GW→EN may be omitted completely in the appropriate circumstances.

The MN 18 may be a hand-held mobile terminal such as a phone, PDA, digital media player or notebook computer for example. The mobile node may also be a mobile router for example.

It will be appreciated that the invention is applicable to all varieties of micro mobility protocols and QoS routing protocols.

Although the embodiments of the invention described with reference to the drawings comprises computer apparatus and methods performed in computer apparatus, the invention also extends to computer programs, particularly computer programs on or in a carrier, adapted for putting the invention into practice. The program may be in the form of source code, object code, a code intermediate source and object code such as in partially compiled form, or in any other form suitable for use in the implementation of the methods according to the invention. The carrier may be any entity or device capable of carrying the program. For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal that may be conveyed via electrical or optical cable or by radio or other means.

When the program is embodied in a signal that may be conveyed directly by a cable or other device or means, the carrier may be constituted by such cable or other device or means. Alternatively, the carrier may be an integrated circuit in which the program is embedded, the integrated circuit being adapted for performing, or for use in the performance of, the relevant methods.

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

The invention claimed is:

1. For a mobile node visiting a packet-switched wireless access network, said access network using a tunnelling-type micro-mobility protocol and a Quality of Service (QoS) routing protocol to route packet data to and from said mobile node, and comprising an access router to which said mobile node may attach, a mobility agent and a gateway, a method of configuring said access network to route packet data toward said mobile node which method comprises:
   (a) receiving in said access network a handover indication of said mobile node or a login request therefrom;
   (b) in response to receiving said handover indication or login request, computing a QoS route for said mobile node at a location in said access network remote from said mobility agent, which QoS route is useable to route packets between said mobility agent and said mobile node; and
   (c) transmitting said QoS route and said handover indication or login request from said remote location toward said mobility agent;
   wherein upon receipt of said handover indication or login request, said mobility agent handles both mobility configuration and QoS route configuration for said mobile node as part of said network handover;
   wherein said access router is a target access router within a different mobility agent domain to an existing access router attached to the mobility agent, wherein said handover indication indicates that a handover must also take place from said mobility agent to a new mobility agent, said handover of said mobile node comprising the following phases:
     (i) performing network layer handover of said mobile node to said target access router and
     (ii) performing network layer handover from said mobility agent to said new mobility agent;
   wherein phase (i) further comprises the steps of said mobile node receiving a Router Advertisement from said target access router, which Router Advertisement comprises an identity of said new mobility agent, whereupon said mobile node stores an indication that a mobility agent handover is required, and following completion of phase (i) said mobile node transmits toward said new mobility agent said handover indication further comprising data for triggering mobility agent handover; and
   further comprising steps of said target access router intercepting said handover indication, computing a QoS route between said new mobility agent and said target access router, and forwarding said QoS route and said handover indication toward said new mobility agent.

2. A method according to claim 1, wherein said remote location is in a routing sense between said mobility agent and said mobile node, whereby computational overhead associated with QoS route computation is moved toward the edge of said access network.

3. A method according to claim 2, wherein said remote location comprises an edge of said access network.

4. A method according to claim 3, wherein said edge comprises said access router to which said mobile node is to be handed over and said mobility agent comprises a router functioning as a Mobility Anchor Point, whereby said method computes a QoS route between said Mobility Anchor Point and said access router.

5. A method according to claim 1, wherein said remote location comprises a router functioning as a Mobility Anchor Point and said mobility agent comprises said gateway to said access network, whereby said method computes a QoS route between said gateway and said Mobility Anchor Point.

6. A method according to claim 1, wherein in response to said handover indication and receipt of said QoS route, said mobility agent reserves resources for said QoS route in said access network and updates a mobility cache stored in memory on behalf of said mobile node, which mobility cache causes packets received at said mobility agent destined for said mobile node to be routed toward said remote location.

7. A method according to claim 1, further comprising a step of said mobility agent storing a routing configuration for said mobile node, which routing configuration causes said packet data to follow said QoS route toward said remote location.

8. A method according to claim 7, further comprising a step of storing a source routing configuration for said mobile node, whereby said packet data is routed with a source routing option toward said mobile node via said remote location.

9. A method according to claim 1, wherein phase (i) comprises said target access router computing a QoS route from said mobility agent to said target access router, and forwarding said QoS route to said new mobility agent, and upon receipt of said QoS route said new mobility agent forwards said QoS route to said mobility agent, whereby said mobility agent updates a mobility cache so that packets for said mobile node are routed to said target access router outside the domain of the mobility agent.

10. A method according to claim 1, wherein upon receipt of data forwarded from said target access router, said new mobility agent communicates with said mobility agent to obtain a QoS context for said mobile node.

11. A method according to claim 1, wherein upon receipt of data forwarded from said target access router, said new mobility agent computes a QoS route between said gateway and said new mobility agent, and forwards said QoS route and a Mobility Agent Change message toward said gateway.

12. A method according to claim 1, wherein following completion of phases (i) and (ii) said method further comprises the steps of routing packets addressed to said mobile node along said QoS route between said gateway and said mobility agent, and along said QoS route between said mobility agent and said target access router.

13. A method according to claim 1, wherein said step (a) comprises intercepting at said access router a Handover Request message from said mobile node destined for said mobility agent, interception of said Handover Request triggering said steps (b)-(c) in said access network.

14. A method according to claim 13, wherein said Handover Request is sent from said mobile node in response to a trigger from said access network.

15. A method according to claim 1, wherein said QoS route comprises a source and a destination in said access network, and said remote location is the destination of said QoS route.

16. A method according to claim 1, wherein said QoS route is in a downlink sense across at least a part of said access network.

17. A method according to claim 1, wherein said QoS route is pre-computed.

18. A packet-switched wireless access network comprising: an access router to which said mobile node may attach; a mobility agent; and a gateway, wherein, in response to either a handover indication or a login request being made by a mobile node, a QoS route for said mobile node is generated in said wireless access network at a location remote from said mobility agent, which QoS route is useable to route packets between said mobility agent and said mobile node; wherein said QoS route and said handover indication or login request are transmitted from said remote location toward said mobility agent; and when said QoS route and said handover indication or login request are received at said mobility agent, said mobility agent handles both mobility configuration and QoS route configuration for said mobile node; wherein said access router is a target access router within a different mobility agent domain to an existing access router attached to the mobility agent, wherein said handover indication indicates that a handover must also take place from said mobility agent to a new mobility agent, said handover of said mobile node comprising the following phases:
  (i) performing network layer handover of said mobile node to said target access router and
  (ii) performing network layer handover from said mobility agent to said new mobility agent;
  wherein phase (i) further comprises the steps of said mobile node receiving a Router Advertisement from said target access router, which Router Advertisement comprises an identity of said new mobility agent, whereupon said mobile node stores an indication that a mobility agent handover is required, and following completion of phase (i) said mobile node transmits toward said new mobility agent said handover indication further comprising data for triggering mobility agent handover; and
  said target access router intercepts said handover indication, computes a QoS route between said new mobility agent and said target access router, and forwards said QoS route and said handover indication toward said new mobility agent.

19. A computer-readable memory storing computer-executable instructions for operating a packet switched wireless access network, the memory comprising:
  computer-executable instructions for receiving in said access network a handover indication of said mobile node or a login request therefrom;
  computer-executable instructions for computing a QoS route for said mobile node at a location in said access network remote from said mobility agent, which QoS route is useable to route packets between said mobility agent and said mobile node in response to said handover indication or login request;
  computer-executable instructions for transmitting said QoS route and said handover indication or login request from said remote location toward said mobility agent; wherein said computer-readable memory is remote of said mobility agent; and wherein an access router, to which said mobile node may attach, is a target access router within a different mobility agent domain to an existing access router attached to the mobility agent, wherein said handover indication indicates that a handover must also take place from said mobility agent to a new mobility agent, said handover of said mobile node comprising the following phases:
    (i) performing network layer handover of said mobile node to said target access router and
    (ii) performing network layer handover from said mobility agent to said new mobility agent;
  wherein phase (i) further comprises the steps of said mobile node receiving a Router Advertisement from said target access router, which Router Advertisement comprises an identity of said new mobility agent, whereupon said mobile node stores an indication that a mobility agent handover is required, and following completion of phase (i) said mobile node transmits toward said new mobility agent said handover indication further comprising data for triggering mobility agent handover; and
  further comprising steps of said target access router intercepting said handover indication, computing a QoS route between said new mobility agent and said target access router, and forwarding said QoS route and said handover indication toward said new mobility agent.

20. The computer-readable memory of claim 19 wherein said memory is within a router.

21. The computer-readable memory of claim 20 wherein said memory is within an access router.

* * * * *